US008293409B2

(12) United States Patent
Suzuki

(10) Patent No.: US 8,293,409 B2
(45) Date of Patent: Oct. 23, 2012

(54) METHOD FOR MAKING ACTIVE MATERIAL AND ELECTRODE, ACTIVE MATERIAL, ELECTRODE, AND LITHIUM ION SECONDARY BATTERY

(75) Inventor: Hisashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 314 days.

(21) Appl. No.: 12/615,589

(22) Filed: Nov. 10, 2009

(65) Prior Publication Data

US 2010/0124704 A1 May 20, 2010

(30) Foreign Application Priority Data

Nov. 17, 2008 (JP) ................. P2008-293444

(51) Int. Cl.
*H01M 4/04* (2006.01)
(52) U.S. Cl. .................................. 429/231.5
(58) Field of Classification Search .......... None
See application file for complete search history.

(56) References Cited

U.S. PATENT DOCUMENTS

| RE35,818 E | 6/1998 | Tahara et al. | |
|---|---|---|---|
| 2006/0185769 A1 | 8/2006 | Nakayama et al. | |
| 2009/0263707 A1 * | 10/2009 | Buckley et al. | 429/94 |

FOREIGN PATENT DOCUMENTS

| CN | 1726304 A | 1/2006 |
|---|---|---|
| EP | 1941943 A1 * | 7/2008 |
| JP | A-6-275268 | 9/1994 |
| JP | A-2001-143694 | 5/2001 |
| JP | A-2002-110151 | 4/2002 |
| WO | WO 2007/034945 A1 | 3/2007 |

OTHER PUBLICATIONS

Olivi et al.; "Preparation and Characterization of a Dip-Coated $SnO_2$ Film for Transparent Electrodes for Transmissive Electrochromic Devices;" *Journal of Electrochemical Society*; May 1993; pp. L81-L82; vol. 140; No. 5.
Deki et al.; "Fabrication of Metal-oxide Nanoparticles by the Liquid Phase Deposition Method in the Heterogeneous System;" *Electrochemistry*; 2004; pp. 452-454; vol. 72; No. 6.
Nakata et al.; "Novel fabrication of highly crystallized nanoparticles in the confined system by the liquid phase deposition (LPD) method;" *Electrochimica Acta*; 2007; pp. 179-185; vol. 53; No. 179.
Deki et al.; "High Quality Monodispersed Oxide Nanoparticles Prepared by the Liquid Phase Deposition Method in Aqueous Polymer Solution;" *ECS Transactions*; 2006; pp. 29-35; vol. 3; No. 9.
Mizuhata et al.; "0-06 Research and Development of High-capacity Electrode Material based on Soft Solution Process [Project on Developing High-Performance Storage System Technologies for Next-Generation Cars];" Abstracts from 2008 New Development Themes and Research Proposal Presentation; 2008; p. 6. (w/ partial translation).

* cited by examiner

*Primary Examiner* — Patrick Ryan
*Assistant Examiner* — Wyatt McConnell
(74) *Attorney, Agent, or Firm* — Oliff & Berridge, PLC

(57) ABSTRACT

The method for making an active material according to the invention comprises a step of contacting an aqueous solution containing a metal-fluoro complex with a carbon material. The active material comprises a carbon material and a metal oxide particle group supported directly on the surface of the carbon material.

13 Claims, 4 Drawing Sheets

(a)

(b)

METHOD FOR MAKING ACTIVE MATERIAL AND ELECTRODE, ACTIVE MATERIAL, ELECTRODE, AND LITHIUM ION SECONDARY BATTERY

BACKGROUND OF THE INVENTION

1. Field of the Invention

The present invention relates to a lithium ion secondary battery, to a method for making an active material and electrode employed therein, and to an active material and electrode produced by the method.

2. Related Background Art

Many types of metal oxide particles (for example, $SnO_2$ particles and the like), having larger charge-discharge capacities than carbon materials such as graphite, have been studied as negative electrode active materials for electrochemical devices such as lithium ion secondary batteries (see Patent documents 1-3 and Non-patent document 1-5, for example). However, using such metal oxide particles as active materials results in significantly lower cycle characteristics compared to carbon materials. The reason for this is believed to be that expansion and contraction of the metal oxide particles during the course the charge-discharge cycle causes dissociation of the metal oxide particles from the collector, thus interfering with conduction between the metal oxide particles and collector.

[Patent document 1] Japanese Unexamined Patent Publication No. 2001-143694
[Patent document 2] Japanese Unexamined Patent Publication No. 2002-110151
[Patent document 3] Japanese Unexamined Patent Publication HEI No. 6-275268
[Non-patent document 1] Electrochemical, Society, Vol. 140, No. 5, L81-L82(1993)
[Non-patent document 2] Electrochemistry, Vol. 72, No. 6, P. 452-454(2004)
[Non-patent document 3] Electrochimica Acta, Vol. 53, No. 179-185(2007)
[Non-patent document 4] ECS Transactions, Vol. 3, No. 9, P. 29-35(2006)
[Non-patent document 5] "Jisedai Jidoshayo Kouseino Chikuden Shisutemu Gijutsu Kaihatsu" [Project On Developing High-Performance Storage System Technologies For Next-Generation Cars] (Li-EAD Project), Abstracts from 2008 New Development Themes and Research Proposal Presentation, p. 6.

SUMMARY OF THE INVENTION

Since sufficient cycle characteristics have not been obtained with the conventional metal oxides as active materials, as mentioned above, it has been desired to obtain active materials that can further improve cycle characteristics, and methods for making them.

The present invention has been accomplished in consideration of the problems described above, and its object is to provide a method for making an active material and electrode that employs a metal oxide with sufficient cycle characteristics, as well as an active material, electrode and lithium ion secondary battery.

Given the technical background described above, the present inventors found that it is possible to obtain an active material with cycle characteristics improved over the prior art, by accumulating a metal oxide particle group as active material on the surface of a carbon material by a specified method. The method involves immersing the carbon material in a metal-fluoro complex aqueous solution and, if necessary, adding a chemical substance known as a scavenger, so that the equilibrium of the following chemical formula (1) is shifted to the right. This method is called liquid phase deposition (LPD).

$$MF_x^{(x-2m)} + nH_2O = MO_n + xF^- + 2nH^+ \quad (1)$$

$$H_3BO_3 + 4H^+ + 4F^- = HBF_4 + 3H_2O \quad (2)$$

$$Al + 6H^+ + 6F^- = H_3AlF_6 + 3/2H_2 \quad (3)$$

Boric acid ($H_3BO_3$), aluminum (Al) and the like are used as scavengers. Boric acid reacts with fluoride ion according to equation (2), to form $HBF_4$. Consumption of fluoride ion causes the equilibrium of equation (1) to shift toward the right, promoting production of $MO_n$ as the metal oxide. Al also reacts with the fluoride ion as represented by equation (3), yielding $H_3AlF_6$. As a result, the equilibrium in equation (1) shifts toward production of $MO_n$ as the metal oxide.

Table 1 shows an example of starting materials and products (oxides), where metal oxide particle groups are formed by such a liquid phase deposition process.

TABLE 1

| Product | Starting materials | | |
|---|---|---|---|
| $ZrO_2$ | $H_2ZrF_6$ | $K_2ZrF_6$ | $(NH_4)_2ZrF_6$ |
| $SiO_2$ | $H_2SiF_6$ | $K_2SiF_6$ | $(NH_4)_2SiF_6$ |
| $TiO_2$ | $H_2TiF_6$ | $K_2TiF_6$ | $(NH_4)_2TiF_6$ |
| ZnO | $ZnF_2$ | | |
| CuO | $CuF_2$ | | |
| $In_2O_3$ | $InF_3$ | | |
| $SnO_2$ | $SnF_2$ | $SnF_4$ | |
| MgO | $MgF_2$ | | |
| $Al_2O_3$ | $AlF_3$ | | |

When a liquid phase deposition process is employed it is possible, even with substances having surface irregularities such as carbon materials, to accomplish covering the surface with a group of metal oxide particles having dense and highly crystalline and good adhesiveness for carbon materials (metal oxides such as $ZrO_2$, $TiO_2$, $SiO_2$, ZnO, CuO, $In_2O_3$, $SnO_2$, MgO and $Al_2O_3$).

The method for making an active material according to the invention comprises a step of contacting an aqueous solution containing a metal-fluoro complex with a carbon material. This will support the metal oxide particle group, containing the oxide of the metal of the metal-fluoro complex, on the surface of the carbon material.

The method for making an electrode according to the invention comprises a step of contacting an aqueous solution containing a metal-fluoro complex with an electrode containing an active material layer including a carbon material and a binder. This will support the metal oxide particle group, containing the oxide of the metal of the metal-fluoro complex, on the surface of primarily the carbon material in the active material layer.

A lithium ion secondary battery employing an active material and electrode obtained according to the invention exhibits more satisfactory cycle characteristics than the prior art. While the reason for this is not entirely clear, it is believed that direct supporting of the metal oxide particle group on the carbon material surface is a factor. For fabrication of a conventional electrode, a coating material obtained by combining metal oxide particles, a conductive aid such as a carbon material and a binder, is coated onto a collector to form an electrode. According to the invention, however, an aqueous solution containing a metal-fluoro complex is contacted with a carbon material during production of the active material and electrode, whereby a group of metal oxide particles is directly supported on the carbon material. This is attributed to improved adhesiveness between the metal oxide particle group and carbon material, compared to electrode-forming methods in which bonding is accomplished with a binder as in the prior art. As a result, dissociation of the metal oxide particle group from the carbon material is inhibited, even when expansion and contraction of the metal oxide has occurred during charge-discharge. It is presumably for this reason that it is easier to sustain electrical conductivity and maintain high cycle characteristics.

The aqueous solution containing the metal-fluoro complex preferably further contains a scavenger that chemically scavenges fluoride ion from the metal-fluoro complex. This can promote deposition of oxides by shifting the equilibrium of equation (1) toward the right.

As scavengers there may be mentioned boric acid, aluminum, ferrous chloride, ferric chloride, sodium hydroxide, ammonia, titanium, iron, nickel, magnesium, copper, zinc, silicon, silicon dioxide, calcium oxide, bismuth oxide, aluminum oxide, magnesium oxide and the like, among which boric acid is preferred.

The metal-fluoro complex also preferably is at least one selected from the group consisting of tin-fluoro complexes and titanium-fluoro complexes. This will provide an effect whereby the group of metal oxide particles composed of the metal is deposited on the surface of the carbon material.

The active material of the invention comprises a carbon material and a metal oxide particle group supported directly on the surface of the carbon material. Such an active material can be easily produced by the method described above, and a lithium ion secondary battery employing the active material and electrode exhibits more satisfactory cycle characteristics than one of the prior art.

The carbon material is preferably carbon black or active carbon. If a carbon material that can function as the active material of the anode is used, it will be possible to increase the battery capacity of the anode.

The metal oxide is preferably at least one selected from the group consisting of tin oxide and titanium oxide.

The mean crystallite size of a tin oxide particle group is preferably 1-6 nm, and the mean crystallite size of a titanium oxide particle group is preferably 3-20 nm. This will further inhibit expansion and contraction of the metal oxide during the course of the charge-discharge cycle. Since dissociation of the metal oxide particle group from the carbon material that interferes with conduction will thus be further prevented, it will be possible to further enhance the cycle characteristics.

The metal oxide particle group may form a layer on the carbon material surface, in which case the thickness of the layer is preferably 5-30 nm. The metal oxide layer may be either laminar or particulate.

The electrode of the invention comprises an active material as described above.

The lithium ion secondary battery of the invention comprises an electrode as described above.

According to the invention there are provided a method for making an active material and electrode employing a metal oxide with sufficient cycle characteristics, as well as an active material, electrode and lithium ion secondary battery.

DESCRIPTION OF THE PREFERRED EMBODIMENTS

Figure 1:
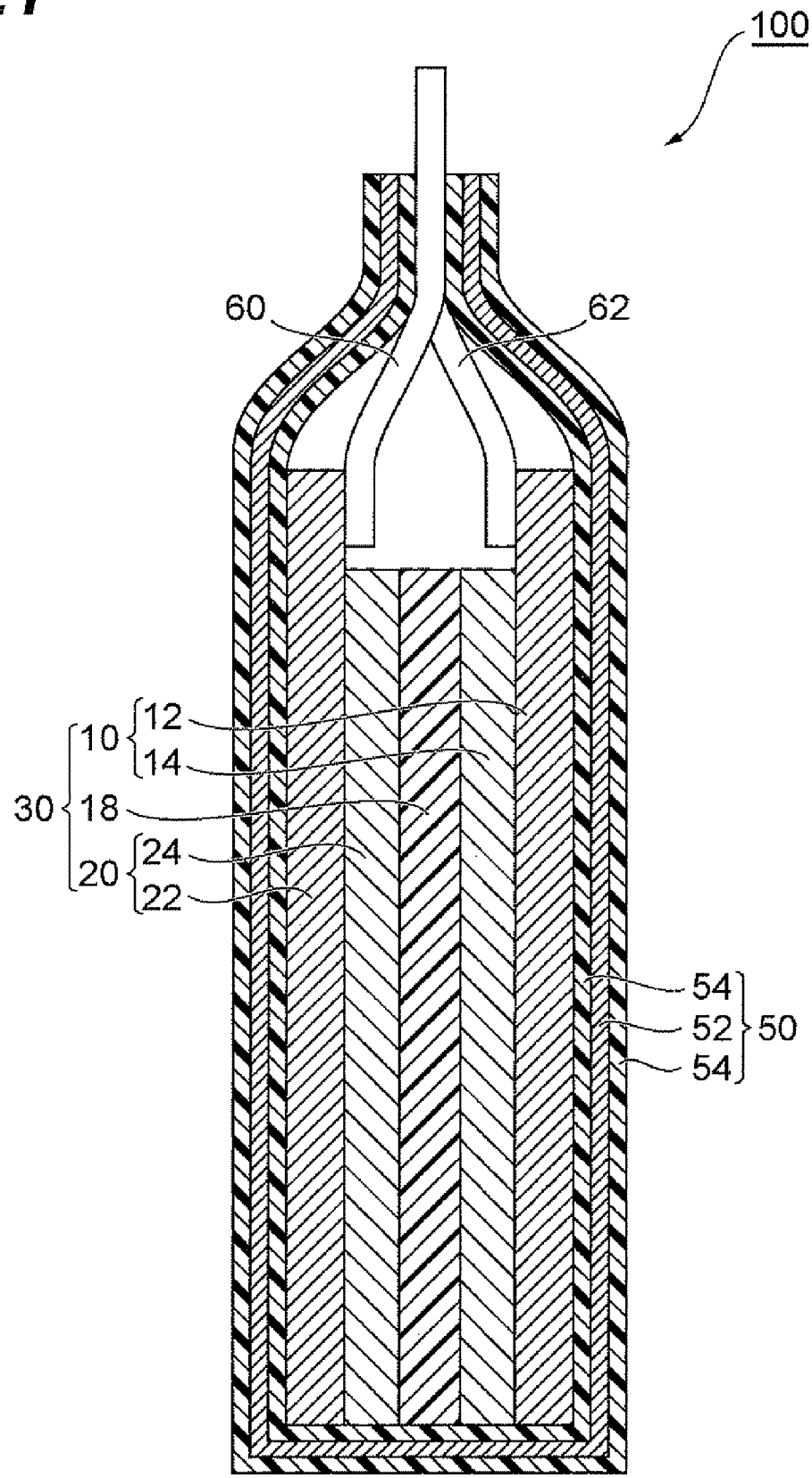
FIG. 1 is a simplified cross-sectional view showing a lithium ion secondary battery according to a first embodiment.

Preferred embodiments of the invention will now be explained in detail, with reference to the accompanying drawings. Throughout the explanation of the drawings, identical or corresponding elements will be referred to by like reference numerals and will be explained only once. Also, the dimensional proportions in the drawings do not necessarily match the actual dimensional proportions.

(Lithium Ion Secondary Battery)

First, a lithium ion secondary battery employing an active material or electrode according to the invention will be explained briefly with reference to FIG. 1.

The lithium ion secondary battery 100 comprises, primarily, a laminated body 30, a case 50 housing the laminated body 30 in a sealed state, and a pair of leads 60, 62 connected to the laminated body 30.

The laminated body 30 has the pair of electrodes 10, 20 laid facing each other across a separator 18. The positive electrode 10 has a positive electrode active material layer 14 formed on a positive electrode collector 12. The negative electrode 20 has a negative electrode active material layer 24 formed on a negative electrode collector 22. The positive electrode active material layer 14 and negative electrode active material layer 24 contact with either side of the separator 18. Leads 60, 62 are connected at the ends of the positive electrode collector 12 and negative electrode collector 22, and the ends of the leads 60, 62 extend out of the case 50.

First Embodiment

Negative Electrode and Method of Making It

An embodiment of the invention will now be described. In the first embodiment, a negative electrode active material having a metal oxide particle group already supported on the surface of a carbon material is formed, and this surface-modified negative electrode active material is used to fabricate a negative electrode.

(Method of Making Negative Electrode Active Material)

First, a carbon material is prepared. The carbon material is preferably carbon black (hereinafter also referred to as "CB"), active carbon, graphite or carbon nanotubes, and more preferably carbon black or active carbon.

The mean particle size of the carbon material is not particularly restricted, but for carbon black it is preferably 3-500 nm, more preferably 20-300 nm and even more preferably 30-200 nm. The mean particle size of the carbon black is determined by observing the carbon black with a transmission electron microscope. In the case of active carbon or graphite, the mean particle size is preferably 0.1-30 μm, more preferably 1-20 μm and even more preferably 2-10 μm. The mean particle size of the active carbon or graphite can be defined, for example, as D50 which is the 50% diameter in the volume-based particle size distribution. The particle size distribution can be easily determined by laser diffraction scattering. Carbon nanotubes preferably have diameters of 0.7-700 nm and lengths of 0.1-10 μm.

An aqueous solution containing a metal-fluoro complex is then prepared. As metal-fluoro complexes there may be mentioned tin-fluoro complex, silicon-fluoro complex, titanium-fluoro complex, zirconium-fluoro complex, indium-fluoro complex, magnesium-fluoro complex, zinc-fluoro complex, aluminum-fluoro complex and the like, among which tin-fluoro complex and titanium-fluoro complex are preferred.

As specific metal-fluoro complexes there may be mentioned one or more selected from the group consisting of hexafluorozirconic acid ($H_2ZrF_6$), hexafluorosilicic acid ($H_2SiF_6$), hexafluorotitanic acid ($H_2TiF_6$), salts of the foregoing, tin fluoride ($SnF_2$, $SnF_4$), indium fluoride ($InF_3$), copper fluoride ($CuF_2$), magnesium fluoride ($MgF_2$), zinc fluoride ($ZnF_2$) and aluminum fluoride ($AlF_3$). Preferred among these are one or more selected from the group consisting of hexafluorotitanic acid and its salts, and tin fluoride.

As salts of metal-fluoro complexes there may be mentioned potassium salts, calcium salts and ammonium salts, of which examples include $K_2ZrF_6$, $K_2SiF_6$, $K_2TiF_6$, $CaZrF_6$, $CaSiF_6$, $CaTiF_6$, $(NH_4)_2ZrF_6$, $(NH_4)_2SiF_6$ and $(NH_4)_2TiF_6$.

These metal-fluoro complexes may be obtained, for example, by dissolving the non-fluoro complex metal compound in aqueous hydrofluoric acid (HF), aqueous ammonium hydrogenfluoride ($NH_4F \cdot HF$), aqueous ammonium fluoride ($NH_4F$), or the like. For example, dissolution of iron oxyhydroxide (FeOOH) and cobalt hydroxide ($Co(OH)_2$) in aqueous $NH_4F \cdot HF$ produces metal-fluoro complexes such as $FeF_6^{3-}$ and $CoF_6^{4-}$ in aqueous solution, which are useful for the invention.

The concentration of the metal-fluoro complex in the aqueous solution will be limited by the solubility of the metal-fluoro complex in water, but for most purposes it is preferably about 0.001-1 M. Here, M=mol/L.

The aqueous solution may also contain a scavenger that can withdraw fluoride ion ($F^-$) from the metal-fluoro complex. Addition of a scavenger can accelerate the deposition rate of the metal oxide.

As scavengers there may be mentioned boric acid ($H_3BO_3$), aluminum (Al), ferrous chloride ($FeCl_2$), ferric chloride ($FeCl_3$), sodium hydroxide (NaOH), ammonia ($NH_3$), titanium (Ti), iron (Fe), nickel (Ni), magnesium (Mg), copper (Cu), zinc (Zn), silicon (Si), silicon dioxide ($SiO_2$), calcium oxide (CaO), bismuth oxide ($Bi_2O_3$), aluminum oxide ($Al_2O_3$), magnesium oxide (MgO) and the like, among which boric acid is preferred. It is not absolutely necessary to use a scavenger, however.

The concentration of boric acid, when used, is limited by the solubility of boric acid in water, but it is preferably about 0.01-0.6 M in the treatment solution.

The carbon material is contacted with the aqueous solution containing the metal-fluoro complex. Specifically, the carbon material is loaded into the aqueous solution containing the metal-fluoro complex, and the mixture is stirred if necessary. Instead of mixing the metal-fluoro complex aqueous solution and scavenger beforehand, the carbon material may be dispersed in an aqueous solution containing the scavenger and the metal-fluoro complex aqueous solution added dropwise thereto. When no scavenger is used, the carbon material may be dispersed in water and the metal-fluoro complex aqueous solution added dropwise thereto.

The equilibrium reaction:

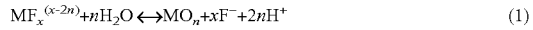  (1)

for example, is established in the aqueous solution, and when $H_3BO_3$ or Al is present as a scavenger, the equilibrium of equation (1) shifts toward the right, as follows:

  (2)

  (3).

Specifically, boric acid reacts with fluoride ion according to equation (2), to form $HBF_4$. As fluoride ion is consumed, the equilibrium of equation (1) shifts toward the right, promoting production of the metal oxide $MO_n$. Al also reacts with the fluoride ion as represented by equation (3), yielding $H_3AlF_6$. As a result, the equilibrium in equation (1) shifts toward production of the metal oxide $MO_n$. Depending on the type of metal-fluoro complex, a scavenger does not need to be used if the reaction rate in equation (1) may be sufficiently high or the metal oxide to be produced functions as a scavenger itself.

Figure 2:
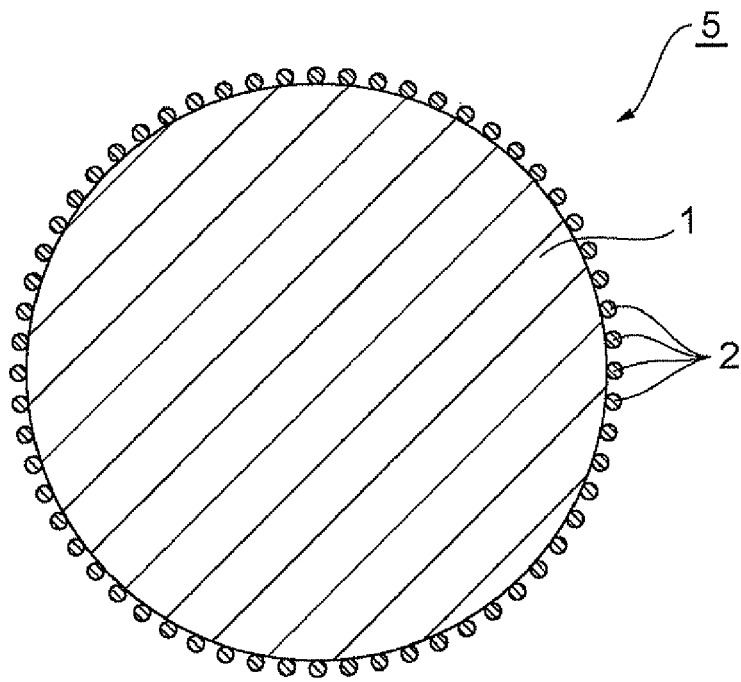
FIG. 2 is a simplified cross-sectional view of an active material according to the first embodiment.
Figure 2:
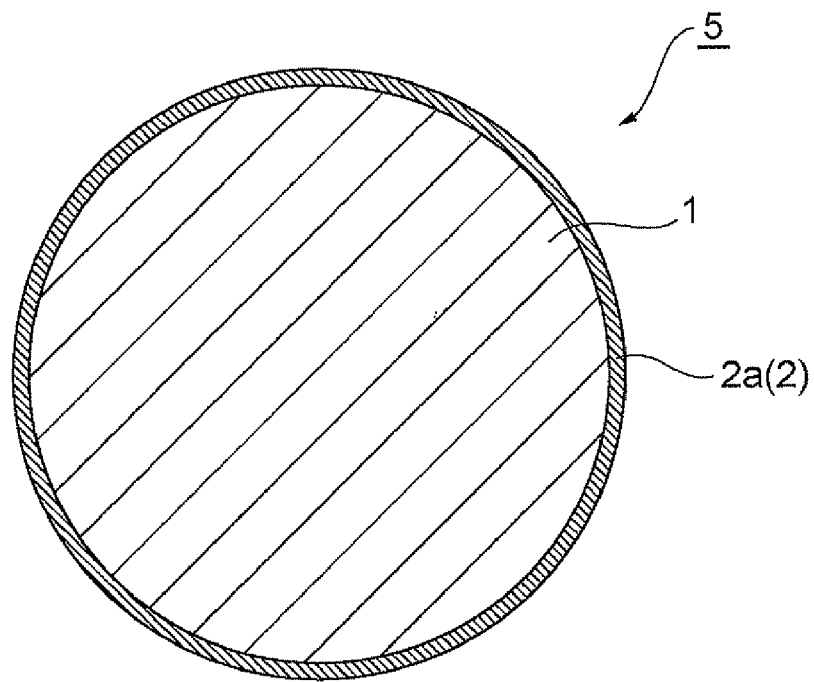

That is, the treatment yields an active material 5 comprising a metal oxide particle group 2 directly supported on the surface of the carbon material 1, as shown in FIG. 2(a). Being directly supported means that the metal oxide particle group 2 is supported on the surface of the carbon material 1 without a binder.

F and/or B may also be present in the metal oxide particle group 2. For example, the concentration of F in the entire active material (carbon material 1+metal oxide particle group 2+F+B) may be 50-5000 ppm by mass, and the concentration of B may be 10-1000 ppm by mass.

The mean crystallite size of the metal oxide particle group 2, for tin oxide, is preferably 1-6 nm, more preferably 2-4 nm and even more preferably 2-3 nm. For titanium oxide, it is preferably 3-20 nm, more preferably 5-17 nm and even more preferably 10-15 nm. For tin oxide, a mean crystallite size of less than 1 nm will tend to reduce the volume while a size of greater than 6 nm will tend to impair the cycle characteristics. For titanium oxide, a mean crystallite size of less than 3 nm will tend to reduce the volume while a size of greater than 20 nm will tend to impair the cycle characteristics. The mean crystallite size is calculated by the Scherrer formula (4) below, using the half-width of the peak for the metal oxide detected by X-ray diffraction.

$$D = K\lambda/(B \cdot \cos\theta) \qquad (4)$$

(In the formula, D: mean crystallite size, K: Scherrer constant, $\lambda$: measuring X-ray wavelength, $\beta$: diffraction profile half-width, $\theta$: diffraction angle)

The mean particle size of the metal oxide particle group 2 is not particularly restricted and may be, for example, 0.1-10 μm.

The proportion of the mass of the metal oxide component with respect to the total of the masses of the carbon material component, including the carbon material 1, and metal oxide component in the active material is preferably 0.1-75% by mass. If the proportion of the metal oxide component mass is less than 0.1% by mass the battery capacity of the negative electrode in the lithium ion secondary battery will tend to be reduced, and if it exceeds 75% by mass the cycle characteristics will tend to be impaired.

As shown in FIG. 2(a), the metal oxide particle group 2 will usually be partially adhering to the surface of the carbon material 1, but in some cases a layer 2a will be formed by the metal oxide particle group 2 on the surface of the carbon material 1, as shown in FIG. 2(b). The thickness of the layer 2a in such cases is not particularly restricted, but for example, it is preferably 5-30 nm and more preferably 3-20 nm. At less than 5 nm the battery capacity of the negative electrode will tend to be reduced, and at greater than 30 nm the cycle characteristics will tend to be impaired.

The mean crystallite size of the metal oxide particle group 2, the proportion of the mass of the metal oxide particle group 2 with respect to the total mass of the carbon material 1 and the metal oxide particle group 2, and the presence or absence of a layer 2a and thickness of the layer 2a, can be easily controlled by selecting appropriate values for the contact time between the carbon material 1 and aqueous solution, the temperature, and the concentration of the metal-fluoro complex and scavenger.

The pH of the aqueous solution used to support the metal oxide particle group 2 is preferably 1.5-12. The pH of the aqueous solution will usually vary depending on, for example, production of $H^+$ by equation (1) when the particle group 2 is supported. A pH of lower than 1.5 will often result in dissolution of the metal oxide, while a pH of higher than 12 will sometimes result in conversion of the metal ions of the metal-fluoro complex to hydroxides in the aqueous solution, resulting in precipitation. According to the invention, the carbon material 1 will not dissolve even if the pH of the aqueous solution is strongly acidic within the above-mentioned range. Consequently, maintaining a pH of 1.5-12 for the aqueous solution when the particle group 2 is supported will allow the metal oxide particle group 2 to be supported more satisfactorily on the carbon material 1. In order to keep the pH of the aqueous solution within the above-mentioned range when the particle group 2 is supported, the pH of the aqueous solution before supporting the particle group 2 may be pre-specified in consideration of the range of pH variation, so that the pH after the particle group 2 has been supported is within the above-mentioned range, or an acid (hydrochloric acid or the like) or base (ammonia water or the like) may be added while supporting the particle group 2.

Once the active material 5 having the metal oxide particle group 2 supported on the surface of the carbon material 1 has been obtained by this treatment, it may be filtered, the aqueous solution and active material 5 separated, and the active material 5 washed with water or the like, and then dried. Thus, according to the invention it is possible to obtain an active material 5 comprising a highly crystalline metal oxide particle group 2, without carrying out heat treatment. Heat treatment may also be carried out, incidentally, to increase the crystallinity.

(Method of Making Negative Electrode)

The active material 5 is used next to fabricate a negative electrode 20. First, the active material 5, negative electrode collector 22 and binder are prepared.

The negative electrode collector 22 used may be a copper foil, for example. The binder is not particularly restricted so long as it can bind the active material 5 to the collector, and any publicly known binder may be used. As examples there may be mentioned fluorocarbon polymers such as polyvinylidene fluoride (PVDF) and polytetrafluoroethylene (PTFE), and mixtures of styrene-butadiene rubber (SBR) with water-soluble polymers (carboxymethylcellulose, polyvinyl alcohol, sodium polyacrylate, dextrin, gluten and the like).

Also, the active material 5 may be added to a solution of the binder dissolved or dispersed in a solvent to prepare a slurry. NMP (N-methyl-2-pyrrolidinone) or water, for example, may be used as the solvent.

The slurry containing the active material and binder is coated onto the surface of the negative electrode collector 22 and dried to complete the negative electrode 20 comprising the negative electrode collector 22 and negative electrode active material layer 24, as shown in FIG. 1. A conductive aid such as carbon black, which is not supporting the metal oxide particle group 2, may also be added to the negative electrode active material layer 24.

(Method of Making Positive Electrode)

The positive electrode 10 can be produced by a known method. Specifically, an aluminum foil or the like may be used as the positive electrode collector 12. The positive electrode active material layer 14 may be one containing a positive electrode active material, a conductive aid and a binder. The binder used may be the same as for the negative electrode.

The positive electrode active material is not particularly restricted so long as it is capable of promoting occlusion and release of lithium ion, deintercalation and intercalation of lithium ion, or reversible doping and dedoping of lithium ion and the lithium ion counter anion (for example, $ClO_4^-$), and any publicly known electrode active material may be used. As examples there may be mentioned complex metal oxides such as lithium cobaltate ($LiCoO_2$), lithium nickelate ($LiNiO_2$), lithium manganese spinel ($LiMn_2O_4$), complex metal oxides represented by the general formula: $LiNi_xCo_yMn_zM_aO_2$ ($x+y+z+a=1$, $0 \leq x \leq 1$, $0 \leq y \leq 1$, $0 \leq z \leq 1$, $0 \leq a \leq 1$, M is one or more elements selected from among Al, Mg, Nb, Ti, Cu, Zn and Cr), lithium vanadium oxide ($LiV_2O_5$), olivine-type $LiMPO_4$ (where M represents one or more elements selected from among Co, Ni, Mn, Fe, Mg, Nb, Ti, Al and Zr, or VO) and lithium titanate ($Li_4Ti_5O_{12}$).

As examples of conductive aids there may be mentioned carbon materials such as carbon black, metal powder such as copper, nickel, stainless steel or iron, mixtures of carbon materials and metal fine powders, and conductive oxides such as ITO.

The method of making the positive electrode 10 may involve preparing a slurry in the same manner as the method of making the negative electrode 20, and coating it onto a collector.

(Method of Making Lithium Ion Secondary Battery)

In addition to the positive electrode and negative electrode described above there are also prepared an electrolyte solution, separator 18, case 50 and leads 60, 62.

The electrolyte solution is added into the positive electrode active material layer 14, negative electrode active material layer 24 and separator 18. There are no particular restrictions on the electrolyte solution, and for the first embodiment, for example, an electrolyte solution (electrolyte aqueous solution or organic solvent-based electrolyte solution) containing a lithium salt may be used. However, since electrolyte aqueous solutions are limited due to low electrochemical decomposition voltage and low durable voltage during charge, it is preferably an organic solvent-based electrolyte solution (non-aqueous electrolyte solution). The electrolyte solution preferably comprises a lithium salt dissolved in a non-aqueous solvent (organic solvent). Examples of lithium salts that may be used include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$ and LiBOB. These salts may be used alone or in combinations of two or more.

As examples of preferred organic solvents there may be mentioned propylene carbonate, ethylene carbonate and diethyl carbonate. These may be used alone or in combinations of two or more in any desired proportion.

For the first embodiment, the electrolyte solution may be a gelatinous electrolyte obtained by adding a non-liquid gelling agent. A solid electrolyte (solid polymer electrolyte or an electrolyte composed of an ionic conductive inorganic material) may be added instead of an electrolyte solution.

The separator 18 may also be formed from an electrical insulating porous body, and as examples there may be mentioned monolayer films and laminated bodies composed of polyethylene, polypropylene or polyolefin, or stretched films comprising mixtures of the above resin, or fiber nonwoven fabrics composed of one or more structural materials selected from the group consisting of cellulose, polyester and polypropylene.

The case 50 has the laminated body 30 and electrolyte solution sealed therein. The case 50 is not particularly restricted so long as it can prevent leakage of the electrolyte solution to the exterior and infiltration of moisture from the exterior into the lithium ion secondary battery 100. For example, the case 50 may be a metal laminate film comprising a metal foil 52 coated on both sides with a polymer film 54, as shown in FIG. 1. The metal foil 52 may be, for example, an aluminum foil, and the polymer film 54 a polypropylene or other film. For example, the material for the outer polymer film 54 is preferably a polymer with a high melting point such as polyethylene terephthalate (PET) or polyamide, while the material for the inner polymer film 54 is preferably polyethylene or polypropylene.

The leads 60, 62 are formed from a conductive material such as aluminum or nickel.

A known method may be used for welding of the leads 60, 62 respectively to the positive electrode collector 12 and negative electrode collector 22, and insertion into the case 50 together with the electrolyte solution, with the separator 18 sandwiched between the positive electrode active material layer 14 of the positive electrode 10 and the negative electrode active material layer 24 of the negative electrode 20, and finally sealing of the opening of the case 50.

According to the first embodiment, the active material 5 used has a metal oxide particle group 2 supported on the surface of the carbon material 1. This will result in more satisfactory cycle characteristics than the prior art. Presumably, this is because direct supporting of the metal oxide particle group 2 on the surface of the carbon material 1 contributes to improved adhesiveness between the metal oxide particle group 2 and carbon material 1. It is assumed that dissociation of the metal oxide particle group 2 from the carbon material 1 is inhibited, thus helping to maintain electrical conductivity, even if expansion and contraction of the metal oxide occur during charge-discharge. Furthermore, it is believed that the very small nm size, as the mean crystallite size of the metal oxide, is also a factor in improving the cycle characteristics. Presumably, this is a factor because the small mean crystallite size helps prevent destruction of the crystals even with expansion and contraction of the crystals occurring with intercalation and dissociation of lithium ion.

Second Embodiment

The second embodiment of the invention will now be explained. According to the second embodiment, the carbon material 1 is used first, before supporting the metal oxide particle group 2, to produce a negative electrode 20 comprising a negative electrode active material layer 24. The negative electrode 20 is then contacted with an aqueous solution containing a metal-fluoro complex to support the metal oxide particle group 2 on the surface of the carbon material 1 in the negative electrode active material layer 24.

The method of making the negative electrode 20 is the same as for the first embodiment, except that a non-surface-modified carbon material 1 is used. The aqueous solution containing the metal-fluoro complex, which is contacted with the negative electrode 20, is also the same as for the first embodiment. The conditions for contact may also be the same as for the first embodiment.

For the second embodiment as well, treatment of the negative electrode causes modification of the surface of the carbon material 1 in the negative electrode active material layer 24 in the same manner as the first embodiment, so that the metal oxide particle group 2 becomes supported thereon. This can produce an effect according to the invention similar to the first embodiment.

EXAMPLES

Example 1

$SnF_2$ (product of Morita Chemical Industries Co., Ltd.) and $H_3BO_3$ (product of Kanto Kagaku Co., Ltd.) were dissolved in water, preparing an 800 ml aqueous solution with concentrations of 0.01 M and 0.05 M, respectively. Next, 10 g of carbon black (product of Denki Kagaku Kogyo Co., Ltd., mean particle size: 36 nm) was added to the aqueous solution and the mixture was stirred at room temperature for dispersion. After 67 hours, the solution was filtered, rinsed and then dried, and the carbon black covered with Sn oxide particle groups was recovered. The pH of the filtrate was 2.6.

When the metal oxide adhering to the carbon black was measured by ICP (using an ICPS-8000 high-frequency inductively coupled plasma analyzer by Shimadzu Corp.), the $SnO_2$ content in the metal oxide-supporting carbon black was found to be 9.8% by mass. Upon measuring the X-ray diffraction (XRD) pattern of the carbon black covered with Sn oxide (using a Model X'pert MPD by PANalytical, line source: Cu), a $SnO_2$ peak was detected, thus confirming the presence of crystalline $SnO_2$. The mean crystallite size was approximately 4.4 nm as determined by the Scherrer formula from the $SnO_2$ peak. The crystallite sizes were calculated using each of the half-widths of all of the $SnO_2$-attributable peaks, and the average value was determined as the mean crystallite size.

Figure 3:
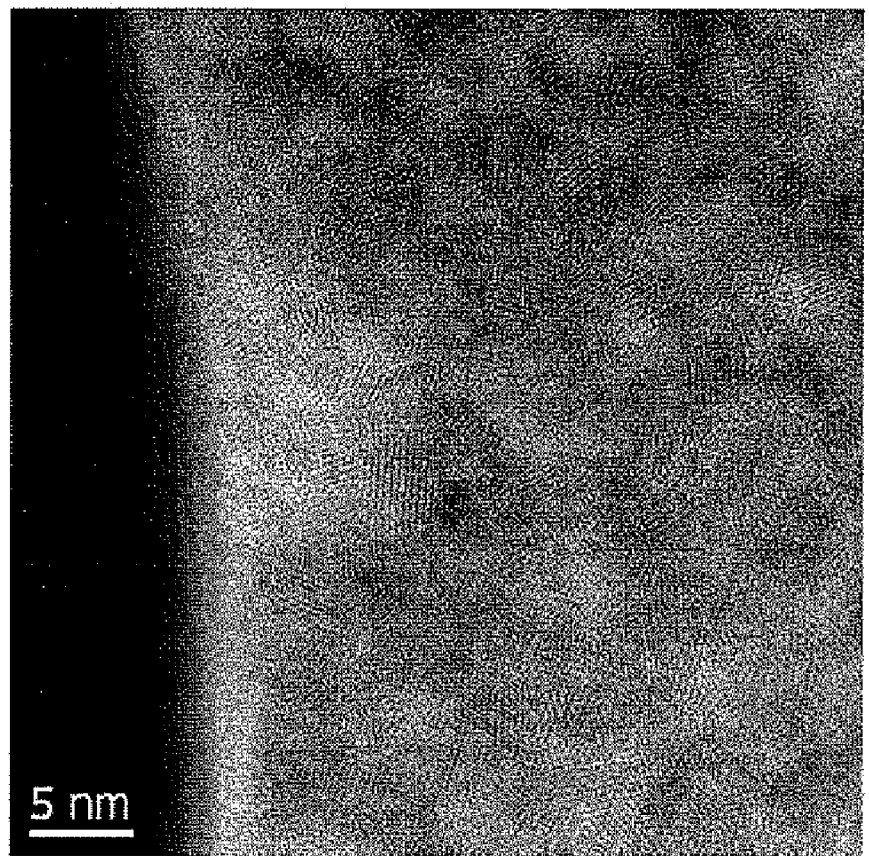
FIG. 3 is a high-magnification TEM photograph of the active material obtained in Example 1.
Figure 4:
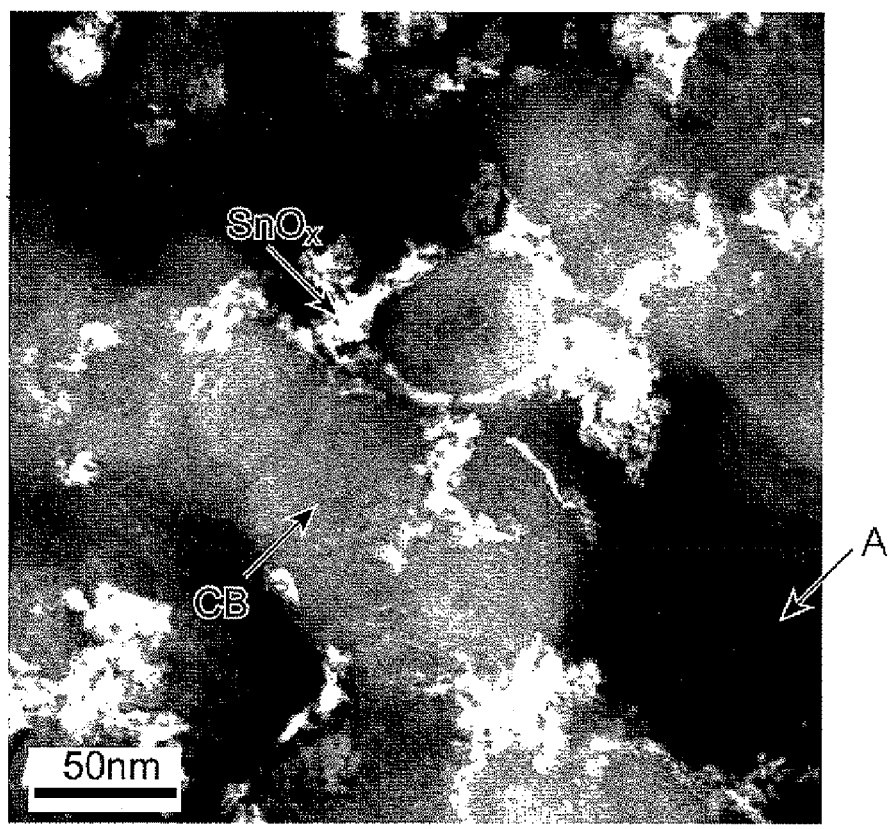
FIG. 4 is a low-magnification TEM photograph of the active material obtained in Example 1.

The $SnO_2$-covered carbon black (hereinafter referred to as $SnO_2$-supporting CB) was analyzed with a scanning transmission electron microscope (STEM). FIG. 3 and FIG. 4 show TEM photographs of the $SnO_2$-supporting CB. FIG. 3 is a high-magnification TEM photograph, in which it was confirmed that the mean crystallite size of the $SnO_2$ particles was approximately 5 nm. FIG. 4 is a low-magnification TEM photograph, in which it was confirmed that $SnO_2$ particles were adhering around the carbon black. In FIG. 4, CB corresponds to carbon black and A corresponds to the embedding resin used for analysis.

[Fabrication of Electrode]

A negative electrode was fabricated using the $SnO_2$-supporting CB as the negative electrode active material and PVDF as the binder. The $SnO_2$-supporting CB was added to and mixed with an NMP solution dissolving the PVDF, to prepare a coating material. The compositional ratio was $SnO_2$-supporting CB:PVDF=75.0:25.0% by mass. After coating the coating material onto a copper foil as the collector (thickness: 16 μm) by doctor blading, it was dried (100° C.) and rolled.

[Fabrication of Cell]

The obtained negative electrode was then laminated with a Li foil (thickness: 100 μm) as the counter electrode, and a polyethylene separator sandwiched between them, to obtain a laminated body (element assembly). The laminated body was placed in an aluminum laminate pack, and after injecting 1 M $LiPF_6$/EC+DEC (30:70, volume ratio) as an electrolyte solution into the aluminum laminate pack, it was vacuum-sealed to fabricate an electrode-evaluating cell (length: 48 mm, width: 34 mm, thickness: 2 mm).

[Evaluation of Electrical Characteristics]

The characteristics of the cell were measured with a charge-discharge current of 0.1 C, a voltage range of 0-3 V and a measuring temperature of 25° C. The discharge capacity after 100 cycles was 90%, with 100% as the initial discharge capacity.

Example 2

$SnF_2$ and $H_3BO_3$ were dissolved in water to prepare an 800 ml aqueous solution with concentrations of 0.01 M and 0.05 M, respectively. Next, 10 g of carbon black was added to the aqueous solution and the mixture was stirred at room temperature for dispersion. After 24 hours, the solution was filtered, rinsed and then dried, and the carbon black covered with Sn oxide particle groups was recovered. The pH of the filtrate was 3.4.

When the metal oxide-supporting CB was subjected to XRD measurement, a $SnO_2$ peak was detected, confirming the presence of crystalline $SnO_2$. The mean crystallite size of the $SnO_2$ particles was 3.4 nm, as measured by XRD. Upon measurement by XRF (fluorescent X-ray analysis, ZSX-100e by Rigaku Corp.), the $SnO_2$ content of the metal oxide-supporting CB was found to be 1.6% by mass. An electrode and cell were fabricated in the same manner as Example 1, and the cell characteristics were measured. The discharge capacity after 100 cycles was 91%, with 100% as the initial discharge capacity.

Example 3

$SnF_2$ was dissolved in water to prepare an 800 ml aqueous solution with a concentration of 0.1 M. Next, 10 g of carbon black was added to the aqueous solution and the mixture was stirred at room temperature for dispersion. After 71 hours, the solution was filtered and rinsed and then dried, and the carbon black covered with Sn oxide particle groups was recovered. The pH of the filtrate was 2.0.

When the metal oxide-supporting CB was subjected to XRD measurement, a $SnO_2$ peak was detected, confirming the presence of crystalline $SnO_2$. The mean crystallite size of the $SnO_2$ particles was 2.5 nm, as measured by XRD. Upon measurement by XRF (fluorescent X-ray analysis, ZSX-100e by Rigaku Corp.), the $SnO_2$ content of the metal oxide-supporting CB was found to be 13.1% by mass. An electrode and cell were fabricated in the same manner as Example 1, and the cell characteristics were measured. The discharge capacity after 100 cycles was 92%, with 100% as the initial discharge capacity.

Comparative Example 1

The same electrode and cell fabrication methods and cell characteristic measurement methods were used as in Example 1, except that $SnO_2$ particles as a reagent by Kanto Kagaku Co., Ltd. were used as the negative electrode active material, and the electrode composition was $SnO_2$:CB:PVDF=90.0:5.0:5.0% by mass. The mean crystallite size of the $SnO_2$ particles was 11 nm, as measured by XRD. The discharge capacity after 100 cycles was 10%, with 100% as the initial discharge capacity.

Comparative Example 2

The same electrode and cell fabrication methods and cell characteristic measurement methods were used as in Example 1, except that SnO particles as a reagent by Kanto Kagaku Co., Ltd. were used as the negative electrode active material. The mean crystallite size of the $SnO_2$ particles was 77 nm, as measured by XRD. The discharge capacity after 100 cycles was 9%, with 100% as the initial discharge capacity.

Comparative Example 3

The same electrode and cell fabrication methods and cell characteristic measurement methods were used as in Example 1, except that $SnO_2$ particles as a reagent by C.I. Kasei Co., Ltd. were used as the negative electrode active material. The mean crystallite size of the $SnO_2$ particles was 18 nm, as measured by XRD. The discharge capacity after 100 cycles was 11%, with 100% as the initial discharge capacity.

Comparative Example 4

$SnF_2$, $H_3BO_3$ and PEG200 (polyethylene glycol with a molecular weight of 200) were used to synthesize simple $SnO_2$ particles. The $SnF_2$ was dissolved in 500 ml of water, and then the $H_3BO_3$ was dissolved. The PEG200 was then added, and water was added to make a 800 ml aqueous solution. The concentrations of the $SnF_2$, $H_3BO_3$ and PEG200 were 0.01 M, 0.05 M and 1 M, respectively. The aqueous solution became white and turbid after several minutes, indicating production of $SnO_2$ particles. After 3 days of standing at room temperature, the dispersion liquid was centrifuged, filtered and rinsed with water and then dried to obtain ultrafine particulate $SnO_2$ particles. The mean crystallite size of the $SnO_2$ particles was 3.0 nm, as measured by XRD. The same electrode and cell fabrication and cell characteristic measurement was conducted as in Example 1, except that these $SnO_2$ particles were used as the negative electrode active material. The discharge capacity after 100 cycles was 20%, with 100% as the initial discharge capacity.

Comparative Example 5

The same electrode and cell fabrication methods and cell characteristic measurement methods were used as in Example 1, except that $SnO_2$ particles of Comparative Example 4 were used as the negative electrode active material, and the electrode composition was $SnO_2$:CB:PVDF=1.2:73.8:25.0% by mass as in Example 2. The discharge capacity after 100 cycles was 30%, with 100% as the initial discharge capacity.

Example 4

An active material was produced in the same manner as Example 1, except that $(NH_4)_2TiF_6$ was used as the metal-fluoro complex, and the reaction time was 24 hours. The pH of the filtrate was 3.6. A $TiO_2$ (anatase) peak was detected by XRD measurement, thus confirming the presence of crystalline $TiO_2$. The mean crystallite size was 16 nm, as measured by XRD. The crystallite sizes were calculated using each of the half-widths of all of the $TiO_2$ (anatase)-attributable peaks, and the average value was determined as the mean crystallite size. Upon measurement by XRF, the $TiO_2$ content of the metal oxide-supporting CB was found to be 0.29% by mass. An electrode and cell were fabricated in the same manner as Example 1, and the cell characteristics were measured. The discharge capacity after 100 cycles was 91%, with 100% as the initial discharge capacity.

Example 5

The same procedure was carried out as in Example 4, except that the reaction time was 70 hours. The pH of the filtrate was 3.6. A TiO$_2$ (anatase) peak was detected by XRD measurement, thus confirming the presence of crystalline TiO$_2$. The mean crystallite size was 18 nm, as measured by XRD. The TiO$_2$ content of the metal oxide-supporting CB was found to be 1.8% by mass. The discharge capacity after 100 cycles was 90%, with 100% as the initial discharge capacity.

Example 6

The same procedure was carried out as in Example 4, except that the (NH$_4$)$_2$TiF$_6$ and H$_3$BO$_3$ concentrations were 0.1 M and 0.2 M, respectively, and the reaction time was 71 hours. The pH of the filtrate was 3.8. A TiO$_2$ (anatase) peak was detected by XRD measurement, thus confirming the presence of crystalline TiO$_2$. The mean crystallite size was 15 nm, as measured by XRD. The TiO$_2$ content of the metal oxide-supporting CB was found to be 10.9% by mass. The discharge capacity after 100 cycles was 92%, with 100% as the initial discharge capacity.

Comparative Example 6

The same electrode and cell fabrication methods and cell characteristic measurement methods were used as in Comparative Example 1, except that TiO$_2$ particles (rutile) as a reagent by Kanto Kagaku Co., Ltd. were used as the negative electrode active material. The mean crystallite size of the TiO$_2$ particles was 670 nm, as measured by XRD. The discharge capacity after 100 cycles was 15%, with 100% as the initial discharge capacity.

Comparative Example 7

The same electrode and cell fabrication method and cell characteristic measurement methods were used as in Comparative Example 1, except that TiO$_2$ particles (anatase) as a reagent by C.I. Kasei Co., Ltd. were used as the negative electrode active material. The mean crystallite size of the TiO$_2$ particles was 38 nm, as measured by XRD. The discharge capacity after 100 cycles was 18%, with 100% as the initial discharge capacity.

Comparative Example 8

(NH$_4$)$_2$TiF$_6$, H$_3$BO$_3$ and PEG200 were used to synthesize simple TiO$_2$ particles. The (NH$_4$)$_2$TiF$_6$ was dissolved in 500 ml of water, and then the H$_3$BO$_3$ was dissolved. The PEG200 was then added, and water was added to make a 800 ml aqueous solution. The concentrations of the (NH$_4$)$_2$TiF$_6$, H$_3$BO$_3$ and PEG200 were 0.01 M, 0.05 M and 1 M, respectively. The aqueous solution became white and turbid after several minutes, indicating production of TiO$_2$ particles. After 3 days of standing at room temperature, the dispersion liquid was centrifuged, filtered and rinsed with water and then dried to obtain ultrafine particulate TiO$_2$ particles. The mean crystallite size of the TiO$_2$ particles was 7.3 nm, as measured by XRD. The same electrode and cell fabrication and cell characteristic measurement were conducted as in Example 1, except that these TiO$_2$ particles were used as the negative electrode active material. The discharge capacity after 100 cycles was 30%, with 100% as the initial discharge capacity.

Comparative Example 9

The same electrode and cell fabrication methods and cell characteristic measurement methods were used as in Example 1, except that TiO$_2$ particles (anatase) of Comparative Example 8 were used as the negative electrode active material, and the electrode composition was TiO$_2$:CB:PVDF=0.2:74.8:25.0% by mass as in Example 4. The discharge capacity after 100 cycles was 40%, with 100% as the initial discharge capacity.

Tables 2 and 3 show the results of evaluating the active materials, mean crystallite sizes, active material compositions, electrode compositions and cell characteristics in Examples 1-6 and Comparative Examples 1-9.

TABLE 2

| | | | LPD production conditions | | | | | |
|---|---|---|---|---|---|---|---|---|
| | | | Active material | | | | | |
| | Type | Production method or source | Fluoride complex (M) | H$_3$BO$_3$ (M) | PEG (M) | Reaction temperature/time | Filtrate pH | Form |
| Example 1 | SnO$_x$ | Supporting on CB by LPD | 0.01 | 0.05 | | Room temp., 67 hrs | 2.6 | SnO$_2$-supporting CB |
| Example 2 | | Supporting on CB by LPD | 0.01 | 0.05 | | Room temp., 24 hrs | 3.4 | SnO$_2$-supporting CB |
| Example 3 | | Supporting on CB by LPD | 0.1 | None | | Room temp., 71 hrs | 2.0 | SnO$_2$-supporting CB |
| Comp. Ex. 1 | | Obtained from Kanto Kagaku | | | | | | SnO$_2$ |
| Comp. Ex. 2 | | Obtained from Kanto Kagaku | | | | | | SnO |
| Comp. Ex. 3 | | Obtained from C.I. Kasei | | | | | | SnO$_2$ |
| Comp. Ex. 4 | | Simple synthesis by LPD | 0.01 | 0.05 | 1.0 | Room temp., 4 days | | SnO$_2$ |
| Comp. Ex. 5 | | Simple synthesis by LPD | 0.01 | 0.05 | 1.0 | Room temp., 4 days | | SnO$_2$ |
| Example 4 | TiO$_2$ | Supporting on CB by LPD | 0.01 | 0.05 | | Room temp., 24 hrs | 3.6 | TiO$_2$ (anatase)-supporting CB |
| Example 5 | | Supporting on CB by LPD | 0.01 | 0.05 | | Room temp., 70 hrs | 3.6 | TiO$_2$ (anatase)-supporting CB |
| Example 6 | | Supporting on CB by LPD | 0.1 | 0.2 | | Room temp., 71 hrs | 3.8 | TiO$_2$ (anatase)-supporting CB |
| Comp. Ex. 6 | | Obtained from Kanto Kagaku | | | | | | TiO$_2$ (rutile) |
| Comp. Ex. 7 | | Obtained from C.I. Kasei | | | | | | TiO$_2$ (anatase) |
| Comp. Ex. 8 | | Simple synthesis by LPD | 0.01 | 0.05 | 1.0 | Room temp., 4 days | | TiO$_2$ (anatase) |
| Comp. Ex. 9 | | Simple synthesis by LPD | 0.01 | 0.05 | 1.0 | Room temp., 4 days | | TiO$_2$ (anatase) |

TABLE 3

|  | Mean crystallite size of metal oxide (nm) | Active material composition | | Electrode composition | | | (Discharge capacity after 100 cycles)/ (Discharge capacity after 1 cycle) * 100 (%) |
|---|---|---|---|---|---|---|---|
|  |  | Metal oxide component (% by mass) | Carbon material component (% by mass) | Metal oxide component (% by mass) | Carbon material component (% by mass) | Binder component (% by mass) |  |
| Example 1 | 4.4 | 9.8 | 90.2 | 7.35 | 67.65 | 25.0 | 90 |
| Example 2 | 3.4 | 1.6 | 98.4 | 1.2 | 73.8 | 25.0 | 91 |
| Example 3 | 2.5 | 13.1 | 86.9 | 9.8 | 65.2 | 25.0 | 92 |
| Comp. Ex. 1 | 11 | 100.0 | 0 | 90.0 | 5.0 | 5.0 | 10 |
| Comp. Ex. 2 | 77 | 100.0 | 0 | 90.0 | 5.0 | 5.0 | 9 |
| Comp. Ex. 3 | 18 | 100.0 | 0 | 90.0 | 5.0 | 5.0 | 11 |
| Comp. Ex. 4 | 3.0 | 100.0 | 0 | 90.0 | 5.0 | 5.0 | 20 |
| Comp. Ex. 5 | 3.0 | 100.0 | 0 | 1.2 | 73.8 | 25.0 | 30 |
| Example 4 | 16 | 0.29 | 99.71 | 0.2 | 74.8 | 25.0 | 91 |
| Example 5 | 18 | 1.8 | 98.2 | 1.35 | 73.65 | 25.0 | 90 |
| Example 6 | 15 | 10.9 | 89.1 | 8.2 | 66.8 | 25.0 | 92 |
| Comp. Ex. 6 | 670 | 100.0 | 0 | 90.0 | 5.0 | 5.0 | 15 |
| Comp. Ex. 7 | 38 | 100.0 | 0 | 90.0 | 5.0 | 5.0 | 18 |
| Comp. Ex. 8 | 7.3 | 100.0 | 0 | 90.0 | 5.0 | 5.0 | 30 |
| Comp. Ex. 9 | 7.3 | 100.0 | 0 | 0.2 | 74.8 | 25.0 | 40 |

What is claimed is:

1. A method for making an active material, comprising a step of contacting an aqueous solution containing a metal-fluoro complex with a carbon material, wherein the active material includes the carbon material and metal oxide particle groups supported directly on the surface of the carbon material, wherein a size of a metal oxide particle group is 0.1-10 µm, and
the metal oxide particle groups are aggregated on the surface of the carbon material.

2. The method for making an active material according to claim 1, wherein the aqueous solution containing the metal-fluoro complex further comprises a scavenger that chemically scavenges fluoride ion from the metal-fluoro complex.

3. The method for making an active material according to claim 1, wherein the carbon material is carbon black or active carbon.

4. The method for making an active material according to claim 1, wherein the metal-fluoro complex is at least one selected from the group consisting of tin-fluoro complexes and titanium-fluoro complexes.

5. A method for making an electrode, comprising a step of contacting an aqueous solution containing a metal-fluoro complex with an electrode containing an active material layer including a carbon material and a binder.

6. An active material comprising a carbon material and metal oxide particle groups supported directly on the surface of the carbon material, wherein a size of a metal oxide particle group is 0.1-10 µm, and
the metal oxide particle groups are aggregated on the surface of the carbon material.

7. The active material according to claim 6, wherein the carbon material is carbon black or active carbon.

8. The active material according to claim 6, wherein a metal oxide of the metal oxide particle group is at least one selected from the group consisting of tin oxide and titanium oxide.

9. The active material according to claim 8, wherein the metal oxide is tin oxide, and a mean crystallite size of tin oxide particle group is 1-6 nm.

10. The active material according to claim 8, wherein the metal oxide is titanium oxide and a mean crystallite size of titanium oxide particle group is 3-20 nm.

11. The active material according to claim 6, wherein the metal oxide particle group forms a layer on the surface of the carbon material, and the thickness of the layer is 5-30 nm.

12. An electrode comprising the active material according to claim 6.

13. A lithium ion secondary battery comprising the electrode according to claim 12.

* * * * *